United States Patent
Hashikami et al.

(10) Patent No.: US 10,567,613 B2
(45) Date of Patent: Feb. 18, 2020

(54) INFORMATION PROCESSING SYSTEM, PROGRAM, AND REQUESTING METHOD

(71) Applicants: Hidenobu Hashikami, Kanagawa (JP); Masafumi Tokiwa, Kanagawa (JP)

(72) Inventors: Hidenobu Hashikami, Kanagawa (JP); Masafumi Tokiwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 15/441,402

(22) Filed: Feb. 24, 2017

(65) Prior Publication Data
US 2017/0257514 A1 Sep. 7, 2017

(30) Foreign Application Priority Data
Mar. 2, 2016 (JP) ................................. 2016-040477

(51) Int. Cl.
*H04L 12/00* (2006.01)
*H04N 1/32* (2006.01)
*H04N 1/00* (2006.01)

(52) U.S. Cl.
CPC ....... *H04N 1/3208* (2013.01); *H04N 1/00225* (2013.01); *H04N 1/00339* (2013.01);
(Continued)

(58) Field of Classification Search
CPC . H04L 41/5054; H04L 45/02; H04L 63/1511; H04L 61/0428; H04L 67/16
(Continued)

(56) References Cited

U.S. PATENT DOCUMENTS

| 6,901,428 | B1 | 5/2005 | Frazier et al. |
| 7,039,563 | B2 * | 5/2006 | Qi ............................ G02C 7/02 351/200 |

(Continued)

FOREIGN PATENT DOCUMENTS

| EP | 1936922 | 6/2008 |
| JP | 2012-209867 | 10/2012 |

(Continued)

OTHER PUBLICATIONS

Francisco Curbera (Editor) et al: "Web Services Metadata Exchange (WS-MetadataExchange)", Internet Citation, Sep. 2004 (Sep. 2004), XP002447526, Retrieved from the Internet: URL: http://specs.xmlsoap.org/ws/2004/09/mex/WS-MetadataExchange0904.pdf [retrieved on Aug. 21, 2007] *p. 2*.

(Continued)

*Primary Examiner* — Frantz Coby
(74) *Attorney, Agent, or Firm* — IPUSA, PLLC

(57) ABSTRACT

An information processing system including at least one input-output device and performing a sequence of processes using electronic data that include image data and print data includes a hardware processor that executes a program so as to implement: an input-output service supply unit configured to perform a collaboration process of causing a hardware computer system implementing an external storage service to collaborate with the input-output device, a request data generation unit configured to generate request data bound for the input-output service supply unit based on metadata, and a request unit configured to request the input-output service supply unit to perform the collaboration process using the request data.

14 Claims, 17 Drawing Sheets

(52) U.S. Cl.
CPC ..... *H04N 1/00344* (2013.01); *H04N 1/00464* (2013.01); *H04N 2201/0094* (2013.01); *H04N 2201/3228* (2013.01)

(58) Field of Classification Search
USPC .................................................. 709/223, 224
See application file for complete search history.

(56) References Cited

U.S. PATENT DOCUMENTS

| | | | | |
|---|---|---|---|---|
| 7,836,130 | B2* | 11/2010 | Korat | G06Q 10/10 709/201 |
| 7,877,445 | B2* | 1/2011 | Komine | G06Q 10/10 709/205 |
| 7,885,913 | B2* | 2/2011 | Weber | G06N 5/022 706/46 |
| 7,941,518 | B2* | 5/2011 | Kim | G06F 9/5072 709/223 |
| 7,966,370 | B1* | 6/2011 | Pegg | H04N 7/15 707/608 |
| 7,996,237 | B2* | 8/2011 | Vedula | G06Q 10/063 705/1.1 |
| 8,543,686 | B2* | 9/2013 | Huh | G06F 9/505 709/223 |
| 8,572,369 | B2* | 10/2013 | Schmidt-Karaca | H04L 63/0428 713/160 |
| 8,701,127 | B2* | 4/2014 | Krishnamoorthy | G06F 9/541 707/705 |
| 8,786,555 | B2* | 7/2014 | Bloomcamp | G06F 3/016 178/18.01 |
| 8,838,670 | B2* | 9/2014 | Poese | H04L 61/1511 709/201 |
| 8,984,126 | B2* | 3/2015 | Fujiwara | H04L 45/02 370/235 |
| 9,015,248 | B2* | 4/2015 | Barreto | G06F 15/16 707/656 |
| 9,019,123 | B2* | 4/2015 | Boulanger | H04Q 9/00 340/870.03 |
| 9,098,315 | B1 | 8/2015 | Kapoor et al. | |
| 9,423,915 | B2* | 8/2016 | Kang | G06F 1/1652 |
| 9,723,062 | B2* | 8/2017 | Bandyopadhyay | H04L 67/16 |
| 9,740,393 | B2* | 8/2017 | Eldawy | G06F 3/0488 |
| 9,853,871 | B2* | 12/2017 | Lee | H04L 41/5054 |
| 2006/0190580 | A1 | 8/2006 | Shu et al. | |
| 2007/0100482 | A1* | 5/2007 | Cotey | H04H 60/04 700/94 |
| 2007/0124475 | A1 | 5/2007 | Syed et al. | |
| 2009/0128504 | A1* | 5/2009 | Smith | G06F 3/0488 345/173 |
| 2010/0027050 | A1 | 2/2010 | Regnier | |
| 2010/0053092 | A1* | 3/2010 | Chen | G06F 3/0416 345/173 |
| 2010/0333011 | A1* | 12/2010 | Kornev | G06F 3/04886 715/773 |
| 2011/0235103 | A1 | 9/2011 | Ito | |
| 2011/0289515 | A1 | 11/2011 | Hung et al. | |
| 2012/0158416 | A1 | 6/2012 | Brunswig et al. | |
| 2013/0125643 | A1 | 5/2013 | Nagasaki | |
| 2013/0286416 | A1 | 10/2013 | Saurabh | |
| 2013/0307796 | A1* | 11/2013 | Liu | G06F 3/041 345/173 |
| 2013/0346258 | A1* | 12/2013 | Ali | G06Q 30/0643 705/27.2 |
| 2014/0146363 | A1 | 5/2014 | Hirokawa et al. | |
| 2014/0310499 | A1* | 10/2014 | Sundararaman | G06F 12/0269 711/203 |
| 2017/0010781 | A1* | 1/2017 | Bostick | G06F 17/211 |

FOREIGN PATENT DOCUMENTS

| | | |
|---|---|---|
| JP | 2013-003819 | 1/2013 |
| JP | 2013-110716 | 6/2013 |
| JP | 2014-130570 | 7/2014 |
| JP | 2015-070554 | 4/2015 |

OTHER PUBLICATIONS

Extended European Search Report for 17158195.2 dated Jul. 3, 2017.
Japanese Patent Application for 2016-040477 dated Oct. 23, 2019.
European Office Action for 17158195.2 dated Nov. 20, 2019.

* cited by examiner

FIG.9

```
{
    thirdPartyStorages: [ {
        thirdPartyStorage: "bbb",
        flow: {
            flowUrl: "ioservice.com/flows/bbb-upload",
            flowParamMappings: [ {
                paramKey: "tenantId",
                paramValue: {
                    resourceType: "baseAppModel",
                    resource: "userInfo.tenantId"
                }
            }, {
                paramKey: "uploadFolderId",
                paramValue: {
                    resourceType: "appSettings",
                    resource: "common.uploadFloderId"
                }
            }, {
                paramKey: "fileName",
                paramValue: {
                    : "baseAppModel",
                    resource: "fileName"
                }
            }, {
                paramKey: "ocr",
                paramValue: {
                    resourceType: "baseAppModel",
                    resource: "ocr"
                }
            } ]
        }
    } ],
}
```

FIG.13

```
{
  flowUrl = "ioservice.com/flows/bbb-upload"
  flowParams = {
    tenantId "TENANT_ID",
    uploadFolderId: "UPLOAD_FOLDER_ID",
    fileName: "FILE_NAME.pdf",
    ocr: "Japanese"
  }
}
```

FIG.15

```
{
    thirdPartyStorages: [ {
        thirdPartyStorage: "bbb",
        flow: {
            flowUrl: "ioservice.com/flows/bbb-download",          ~4010
            flowParamMappings: [ {
                paramKey: "tenantId",
                paramValue: {
                    resourceType: "baseAppModel",
                    resource: "userInfo.tenantId"
                }
            }, {
                paramKey: "downloadFileId ",
                paramValue: {
                    resourceType: "baseAppModel",
                    resource: "downloadFileId "
                }
            }
            ]
        }
    } ],
}
```

4000

4020 — flowParamMappings bracket

FIG.16

| ITEM | TYPE | EXPLANATION |
|---|---|---|
| thirdPartyStorages | ARRAY | Set of flow metadata of external storage service, flow metadata is added every increase of delivery destination folder |
| thirdPartyStorage | CHARACTER STRING | Identifier of external storage service |
| flowUrl | CHARACTER STRING | (URL or flow ID of input-output service) |
| flowParamMappings | ARRAY | Metadata for generating request parameter |
| paramKey | CHARACTER STRING | Key of request parameter |
| paramValue | OBJECT | |
| resourceType | CHARACTER STRING | Identifier of designating from which value of request parameter is acquired, baseAppModel means acquisition from cache (or local storage) of browser |
| resource | CHARACTER STRING | Key of browser cache (local storage) |

FIG.17

```
{
  flowUrl = "ioservice.com/flows/bbb-download"
  flowParams = {
    tenantId "TENANT_ID",
    downloadFileId: "DOWNLOAD_FILE_ID"
  }
}
```

FIG.18

| ITEM | TYPE | EXPLANATION |
|---|---|---|
| flowUrl | CHARACTER STRING | URL of flow of input-output service |
| flowParams | OBJECT | Request parameter of HTTP POST to input-output service |
| tenantId | CHARACTER STRING | Identifier of user |
| downloadFileId | CHARACTER STRING | ID of file that is stored in external storage service and required to be printed |

INFORMATION PROCESSING SYSTEM, PROGRAM, AND REQUESTING METHOD

CROSS-REFERENCE TO RELATED APPLICATIONS

The present application claims priority under 35 U.S.C. § 119 to Japanese Patent Application No. 2016-040477, filed Mar. 2, 2016. The contents of which are incorporated herein by reference in their entirety.

BACKGROUND OF THE INVENTION

Field of the Invention

The present invention relates to information devices, and in particular, relates to an information device that utilizes a touch screen.

The present invention relates to an information processing system, a program, and a requesting method.

Description of the Related Art

There is a service (hereinafter, referred to as an apparatus collaboration service) that associates an input-output device for a document such as a multifunction periphery with a computer system that supplies an external storage service lending a memory area of a storage through a network. An exemplary apparatus collaboration service is a "scan to storage service" by which image data obtained by scanning in a multifunction periphery using an application of the multifunction periphery are delivered to a preset external storage service.

For example, there is an image forming apparatus that can install an application substantializing a function of sending the scanned image data to a set sending destination. There is supplied a service that receives image data, receive the image data, and executes a predetermined process for the image data (e.g., Patent Document 1).

Patent Document 1: Japanese Unexamined Patent Application Publication No. 2014-130570

SUMMARY OF THE INVENTION

An information processing system including at least one input-output device and performing a sequence of processes using electronic data that include image data and print data and including a hardware processor that executes a program so as to implement: an input-output service supply unit configured to perform a collaboration process of causing a hardware computer system implementing an external storage service to collaborate with the input-output device, a request data generation unit configured to generate request data bound for the input-output service supply unit based on metadata, and a request unit configured to request the input-output service supply unit to perform the collaboration process using the request data.

BRIEF DESCRIPTION OF THE DRAWINGS

FIG. 9 illustrates a structure of exemplary metadata for generating request data for an input-output service apparatus.

FIG. 13 illustrates a structure of exemplary request data.

FIG. 15 illustrates a structure of exemplary metadata for generating request data (download option) for the input-output service apparatus.

FIG. 16 is an explanatory chart of exemplary items included in the metadata.

FIG. 17 illustrates a structure of exemplary request data (download option).

FIG. 18 is an explanatory chart of exemplary items included in the metadata.

DESCRIPTION OF THE EMBODIMENTS

Hereinafter, an embodiment of the present invention is described in detail with reference to figures.

First Embodiment

<System Structure>

Figure 1:
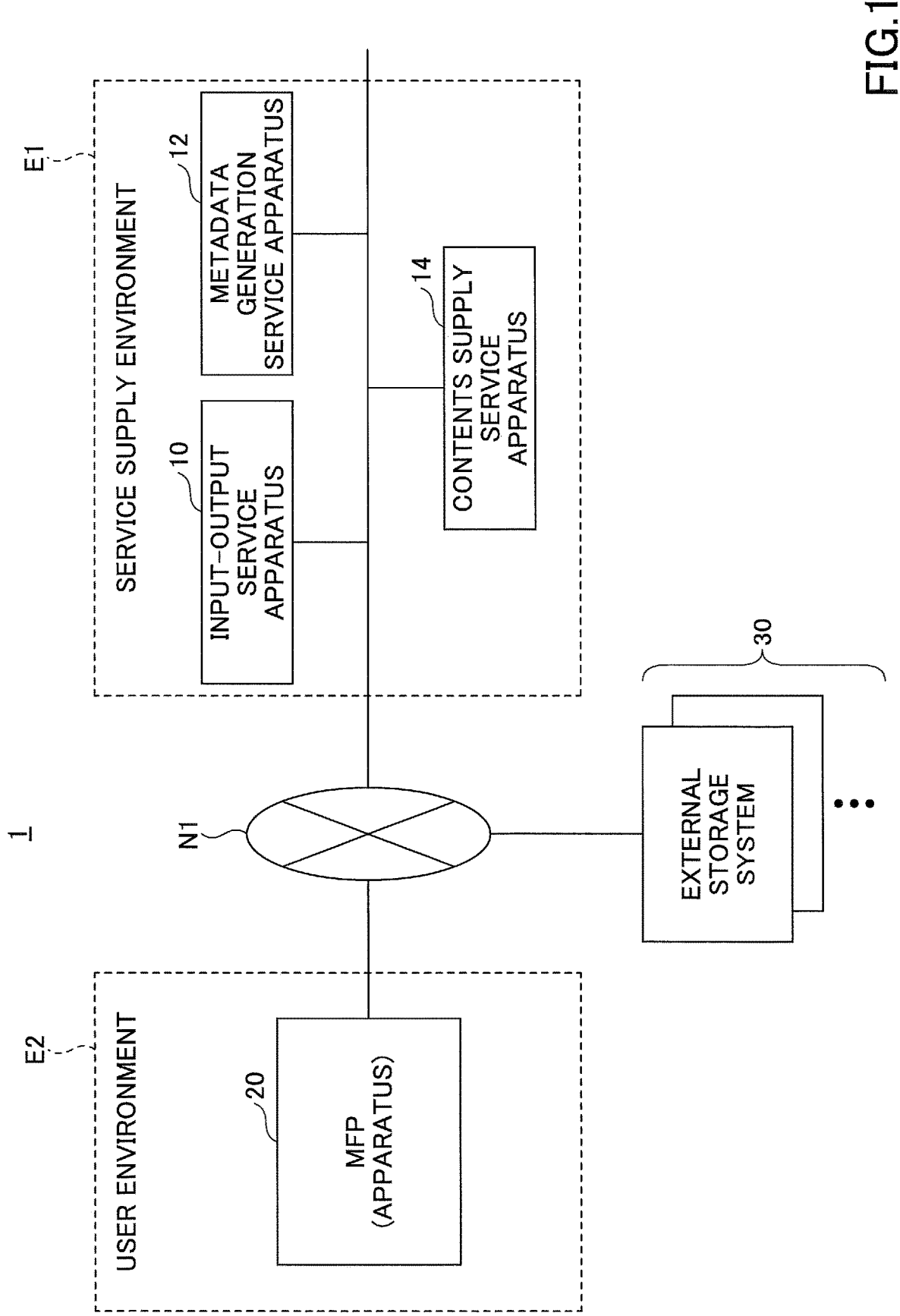
FIG. 1 illustrates a system structure of an exemplary information processing system of a first embodiment.

Referring to FIG. 1, an information processing system 1 of a first embodiment is described. FIG. 1 illustrates a system structure of an exemplary information processing system of the first embodiment.

The information processing system 1 illustrated in FIG. 1 includes a service supply environment E1, a user environment E2, and an external storage system 30, and is communicably coupled through a wide area network N1 such as the Internet.

The service supply environment is a system environment in an organization supplying various services such as a cloud service, which associates with the external storage system 30 through the network N1.

For example, the first embodiment may be applied to various services such as a service provided by an application service provider (ASP) and a web service, which are provided through the network.

The service supply environment E1 is substantialized by at least one information processing apparatus. Referring to FIG. 1, the service supply environment E1 includes an input-output service apparatus 10, a metadata generation service apparatus 12, and a contents supply service apparatus 14. The user environment E2 is a system environment in an organization such as a user enterprise of the MFP 20 being an example of an input-output device. The user environment E2 includes at least one MFP 20.

The external storage system 30 is a computer system providing an external storage service called an online storage through the network N1. The external storage service is a service of lending a memory area of a storage through the network N1. Within the embodiment, the memory area lent by the external storage system 30 is a delivery destination candidate of the delivery destination of the image data.

Referring to FIG. 1, the information processing system 1 is formed by connecting the input-output service apparatus 10, the metadata generation service apparatus 12, and the contents supply service apparatus 14, which are included in the service supply environment E1, are connected to the network N1 through a LAN or the like. The MFP 20 in the user environment E2 is connected to the network N1 through the LAN or the like.

The input-output service apparatus 10 supplies a service (hereinafter, referred to as an input-output service) including a function of absorbing a difference of a unique function (a capability of adding bibliographic information) of the at least one external storage system 30, a function of optical character recognition (OCR) process, and a function of file conversion. The input-output service apparatus 10 supplies the input-output service substantialized by causing the MFP 20 of the user environment E2 to collaborate with an application of the input-output service apparatus 10. A development of a service (hereinafter, referred to as an apparatus collaboration service) of causing the MFP 20 as an example of the input-output device to collaborate with the external storage system 30 becomes easy by using the input-output service.

The metadata generation service apparatus 12 provides a service that can define the metadata for generating the request data for the input-output service apparatus 10. A developer developing an application (hereinafter, referred to as a MFP application) for the apparatus collaboration service installed on the MFP 20 defines the metadata for the metadata generation service apparatus 12. Within the embodiment, the data for generating the request data are called the "metadata".

Within the embodiment, the MFP application is a Web application operated in the Web browser that is installed on the MFP 20. For example, the MFP application are described using hypertext markup language (HTML), cascading style sheets (CSS), and JavaScript ("JavaScript" is the registered trademark. The contents supply service apparatus 14 supplies the MFP application to the MFP 20. For example, the contents supply service apparatus 14 is substantialized by a service program for supplying the MFP application and an information processing apparatus, in which the service program is operated.

For example, the input-output service apparatus 10 supplies the scan delivery service that delivers the image data obtained by scanning in the MFP 20 to the external storage system 30. The input-output service apparatus can also supply a download print service, in which the MFP 20 prints the print data acquired from the external storage system 30. Within the first embodiment, the scan delivery service is explained as an example.

The service supplied by the input-output service apparatus 10 is not limited to a scan delivery service and a download print service. Further, the information processing system 1 is not limited to the structure illustrated in FIG. 1, and all or a part of the service supply environment E1 may be installed in the user environment E2. Said differently, all or a part of the information processing apparatus forming the service supply environment E1 may be included in the user environment E2. The user environment E2 may include various devices such as a scanner, a printer, a fax machine, an electronic whiteboard, and a projector.

In the following explanation, multiple external storage systems 30 are distinguished like an external storage system 301 and an external storage system 302.

<Hardware Structure>
<<Computer>>

Figure 2:
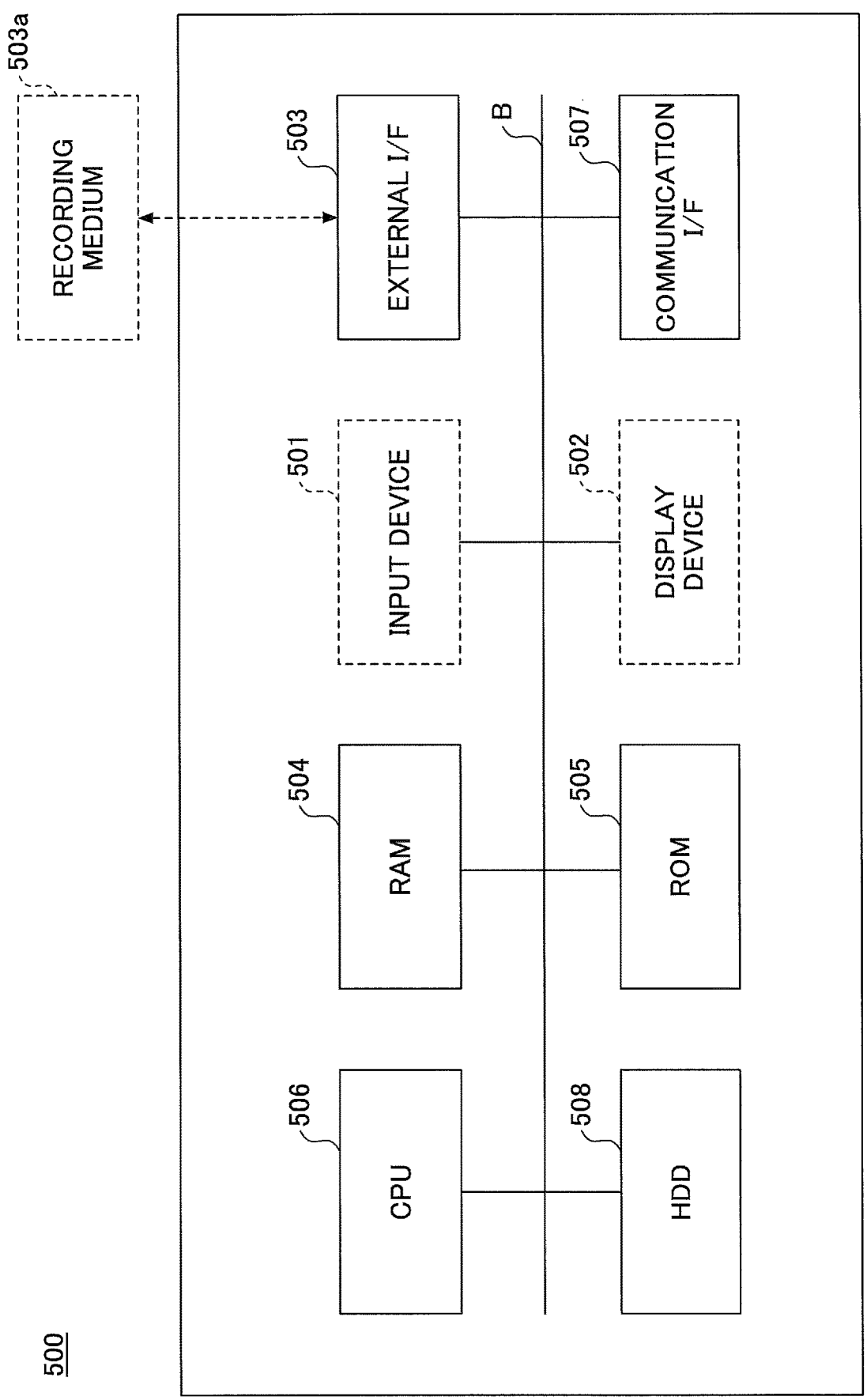
FIG. 2 illustrates a hardware structure of an exemplary computer of the embodiment.

The input-output service apparatus 10, the metadata generation service apparatus 12, the contents supply service apparatus 14, and the external storage system 30 are substantialized by a computer having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external interface (I/F) 503, a random access memory (RAM) 504, a read-only memory (ROM) 505, a central processing unit (CPU) 506, a communication interface (I/F) 507, a hard disk drive (HDD) 508, and so on, which are mutually connected by a bus B. It is acceptable to use a mode where the input device 501 and the display device 502 are coupled when necessary.

The input device 501 includes a keyboard, a mouse, a touch panel, or the like, by which a user can input various operation signals. The display device 502 includes a display or the like to display a processed result obtained by the computer 500.

The communication I/F 507 is an interface provided to connect the computer 500 with various networks. Thus, the computer 500 can perform data communications through the communication I/F 507.

The HDD 508 is an exemplary non-volatile memory device that stores a program and data. The stored program and data are an operating system (OS), which is basic software controlling the entire computer 500, application software (hereinafter, simply referred to as an "application") providing various functions in the OS. The computer 500 may use a drive device (e.g., a solid state drive (SSD)) using a flash memory as a memory medium in place of the HDD 508.

The external I/F 503 is an interface with an external apparatus. The external apparatus is a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the computer 500. The RAM 504 is an example of a volatile semiconductor memory (a memory device) temporarily storing the program and/or the data.

The CPU 506 is an arithmetic device that reads the program and/or the data from the memory device such as the ROM 505, the HDD 508, or the like. The read program or the read data undergo a process so as to substantialize a control or a function of the entire computer 500.

The input-output service apparatus 10, the metadata generation service apparatus 12, the contents supply service apparatus 14, and the external storage system 30 can perform various processes using the hardware structure of the computer 500 illustrated in, for example, FIG. 2.

<<MFP>>

Figure 3:
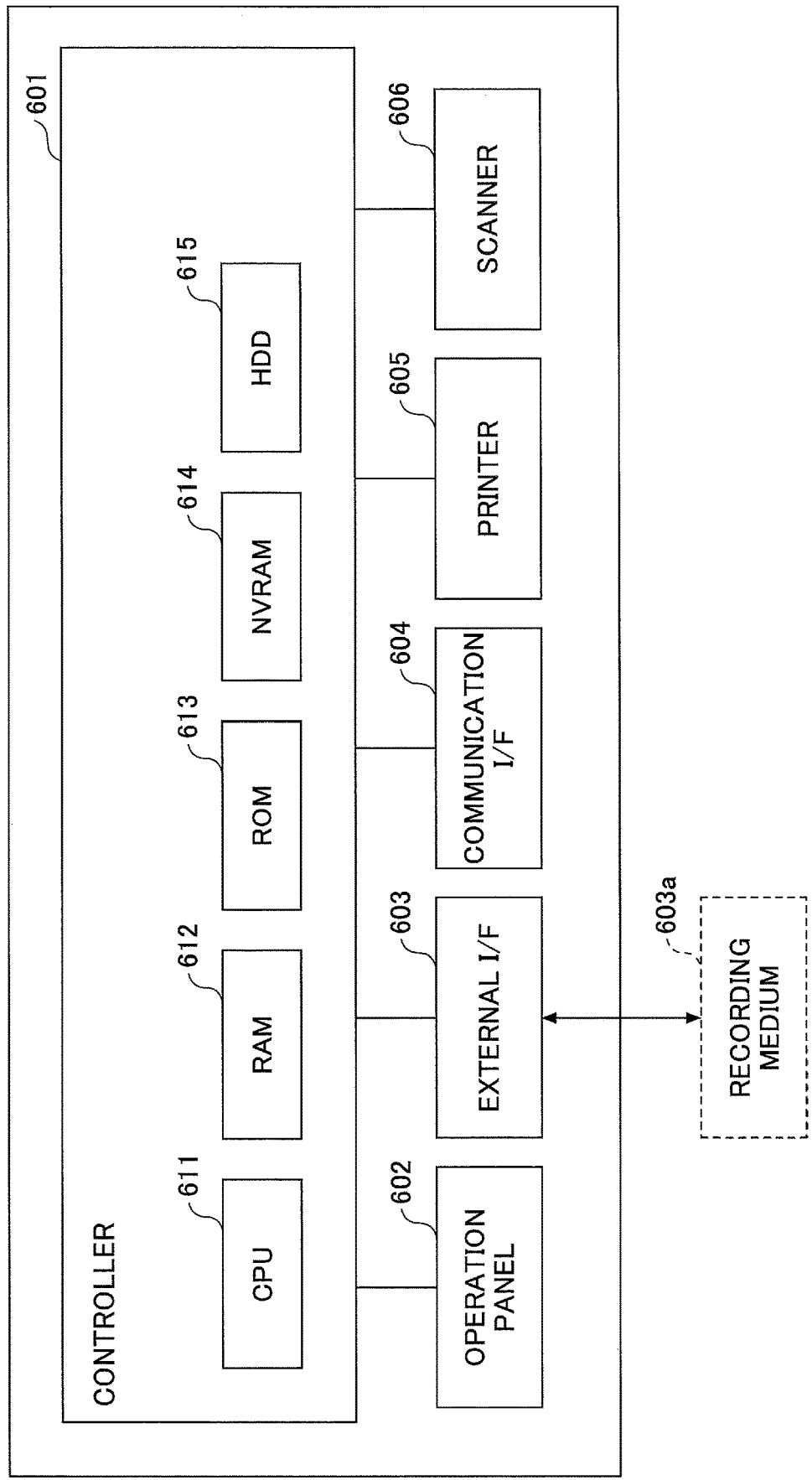
FIG. 3 illustrates a hardware structure of an exemplary multifunction peripheral (MFP) of the embodiment.

The MFP 20 illustrated in FIG. 1 is substantialized by a computer having a hardware structure illustrated in, for example, FIG. 3. FIG. 3 illustrates an exemplary hardware structure of the MFP of the first embodiment. The MFP 20 illustrated in FIG. 3 includes a controller 601, an operation panel 602, an external I/F 603, a communication I/F 604, a printer 605, a scanner 606, and so on.

The controller 601 includes a central processing unit (CPU) 611, a random access memory (RAM) 612, a read-only memory (ROM) 613, a non-volatile random access memory (NVRAM) 614, a hard disk drive (HDD) 615, and so on. Various programs and data are stored in the ROM 613. The RAM 612 temporarily stores the program and the data. Setup information or the like is stored in the NVRAM 614. Various programs and data are stored in the HDD 615.

The CPU 611 reads the program, the data, setup information, or the like into the RAM 612 from the ROM 613, the NVRAM 614, the HDD 615, or the like, and performs the process. Thus, the CPU 611 substantializes an entire control or functions of the MFP 20.

The operation panel 602 includes an input unit for receiving an input from the user and a display unit for performing display. The external I/F 603 is an interface with the external apparatus. The external apparatus is a recording medium 603a or the like. With this, the MFP 20 can read information from the recording medium 603a and/or write information to the recording medium 603a through the external I/F 603. The recording medium 603a is an integrated circuit (IC) card, a flexible disk, a compact disk (CD), a digital versatile disk (DVD), a secure digital (SD) memory card, a universal serial bus (USB) memory, or the like.

The communication I/F 604 is an interface disposed to connect the MFP 20 with the network N1. Thus, the MFP 20 can perform data communications through the communication I/F 604. The printer 605 is provided for printing print data on a print paper. The scanner is an apparatus for reading image data (electronic data including image data and print data) from an original manuscript.

<Function Structure>

Figure 4:
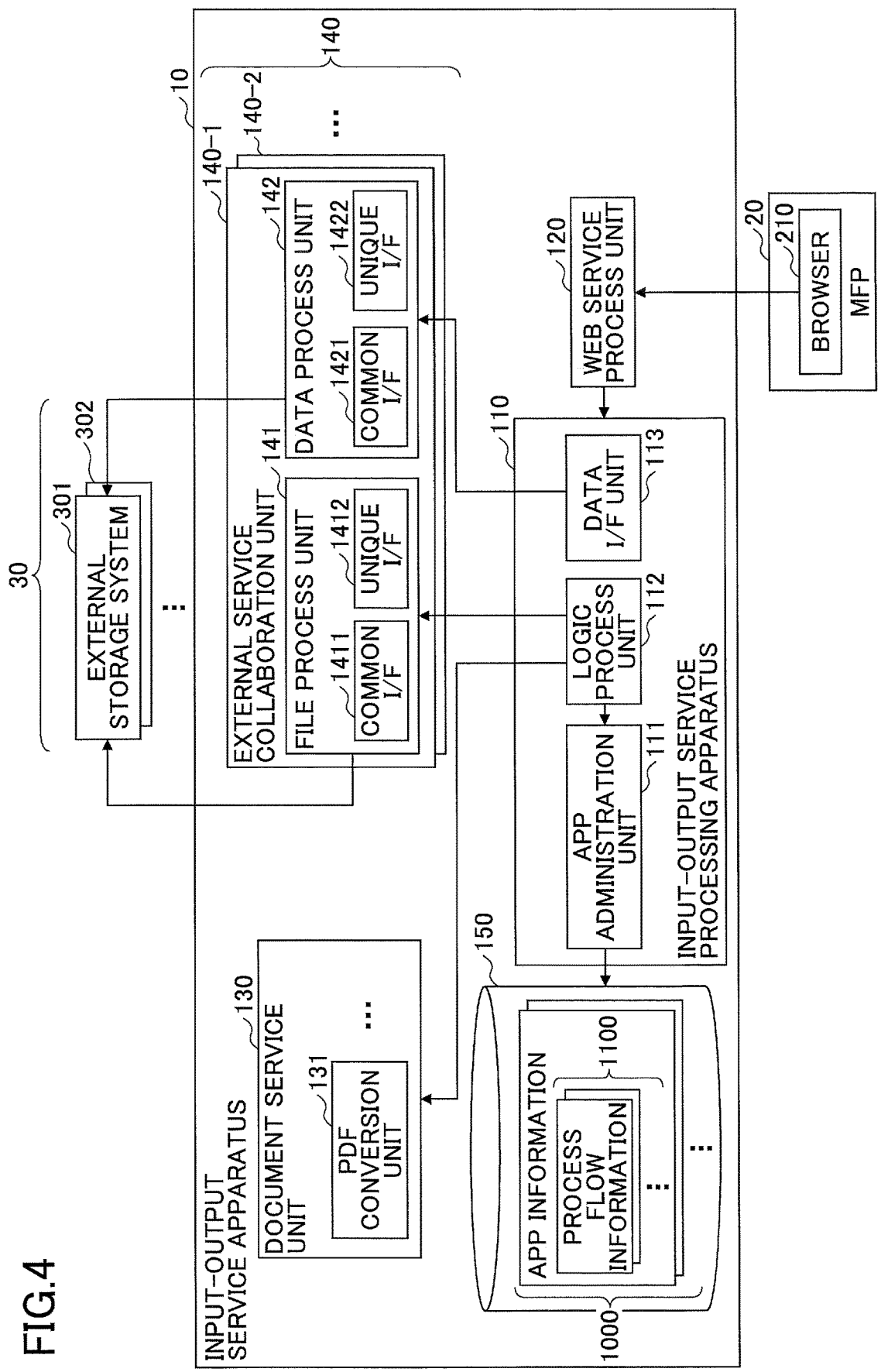
FIG. 4 illustrates a function structure of an exemplary input-output service apparatus of the embodiment.

Referring to FIG. 4, the function structure of the information processing system 1 of the first embodiment is described next.

<<Input-Output Service Apparatus>>

FIG. 4 illustrates a function structure of an exemplary input and output service apparatus of the embodiment. Referring to FIG. 4, in addition to the input-output service apparatus 10, the MFP 20 and the external storage system 30 are illustrated. The browser 210 is installed on the MFP 20. The user of MFP 20 can use an input-output service supplied by the input-output service apparatus 10 through the browser 210. As such, the browser 210 may be installed on the apparatus 20 such as the MFP 20 of the first embodiment.

The input-output service apparatus 10 of the first embodiment includes an input-output service process unit 110, a web service process unit 120, a document service unit 130, and an external service collaboration unit 140. These units are implemented when one or more programs installed on the input-output service apparatus 10 are executed by the CPU 506.

The input-output service apparatus 10 of the first embodiment includes an app information memory unit 150. The app information memory unit 150 can be implemented by the HDD 508. The app information memory unit 150 may be implemented by a memory device or the like, which is connected with the input-output service apparatus 10 through the network.

The input-output service process unit 110 performs a process related to the input-output service. The input-output service process unit 110 includes an application (app) administration unit 111, a logic process unit 112, and a data I/F unit 113.

An app administration unit 111 administers application (app) information 1000 stored in an app information memory unit 150. The app information 1000 is an application through which the input-output service apparatus 10 supplies various input-output services. Said differently, various input-output services supplied by the input-output service apparatus 10 is supplied as the app information 1000.

Further, the app administration unit 111 returns the process flow information 1100 included in the app information 1000 in response to a request from the logic process unit 112. The process flow information 1100 defines a sequence of processes (a process flow) substantializing the input-output service supplied by the app information 1000.

The logic process unit 112 acquires the process flow information 1100 from the app administration unit 111 in response to the request from the web service process unit 120. The logic process unit 112 executes the process flow substantializing the input-output flow based on the acquired process flow information 1100. With this, various input-output services are supplied by the input-output service apparatus 10 in the information processing system 1.

The data I/F unit 113 sends various requests to the data process unit 142 of the external service collaboration unit 40 in response to the request from the web service process unit 120. For example, the data I/F unit 113 sends an acquisition request to acquire a folder view to the data process unit 142 of the external service collaboration unit 140.

The web service process unit 120 sends various requests to the input-output service process unit 110 in response to the request from the browser 210. For example, the web service process unit 120 sends a process execution request to execute the process of the scan delivery service to the logic process unit 112 of the input-output service process unit 110.

The document service unit 130 is a group of programs (modules) for executing the processes included in the sequence of processes (the process flow) based on the process flow information 1100. The document service unit 130 includes a PDF conversion unit 131 that converts the data format of an electronic file to a PDF format, as an example.

The document service unit 130 may include various programs implementing a print conversion unit that converts the data format (print data) of the electronic file so as to be printable by the MFP 20 and a compression and decompression process unit that compresses or decompresses the electronic file 20, for example.

The storage-service collaborating unit 140 requests the external storage system 30 to execute various processes in response to a request received from the logic processing unit 112 or the data I/F unit 113. The input-output service apparatus 10 of the first embodiment includes an external service collaboration unit 140 corresponding to each of the external storage systems 30.

The external service collaboration unit 140 includes a file process unit 141 for receiving a request from the logic process unit 112 and a data process unit 142 for receiving the request from the data I/F unit 113.

The file process unit 141 includes a common I/F 1411 and a unique I/F 1412, in which an application programming interface (API) for conducting an operation to the electronic file stored in the external storage system 30 is defined. The operation to the electronic file is, for example, acquisition, storage, edit, or the like.

The common I/F 1411 is an API usable among multiple external storage systems 30 in common. Said differently, the common I/F 1411 of the file process unit 141 is the group of APIs for using a function (e.g., acquisition, storage, or the like of the electronic file) related to a file operation that can be used by all the external storage systems 30.

Meanwhile, the unique I/F 1412 is the API usable by the specific external storage system 30. Said differently, the unique I/F 1412 of the file process unit 141 is an API group for using a function (e.g., edit of the electronic file or the like) related to the file operation and can be used by a specific external storage system 30.

Therefore, the common I/F 1411 is similarly defined for all the external-storage collaboration units 140. On the other hand, the unique I/F 1412 is defined for the external service collaboration unit 140 corresponding to the specific external storage system 30, in which the API defined by the unique I/F 1412 can be used.

On the other hand, the data process unit 142 includes a common I/F 1421 and a unique I/F 1422, in which an API for acquiring the metadata (e.g., the file view, the folder view, or the like) of bibliographic information of the electronic file stored in the external storage system 30 is defined.

The common I/F 1421 is an API usable among the multiple external storage systems 30 in common. Said differently, the common I/F 1421 of the data process unit 142 is an API group of using a function (e.g., acquisition of the file view, the folder view, or the like) such as acquisition of the metadata that can be used by all the external storage systems 30.

Meanwhile, the unique I/F 1422 is the API usable by the specific external storage system 30. Said differently, the unique I/F 1422 of the data process unit 142 is an API group for using a function such as metadata acquisition (e.g., acquisition of an image file view), which can be used by the specific external storage system 30.

Therefore, the common I/F 1421 is similarly defined for all the external service collaboration units 140. On the other hand, the unique I/F 1422 is defined for the external service collaboration unit 140 corresponding to the specific external storage system 30, in which the API defined by the unique I/F 1422 can be used.

In a case where the external storage system 30 that is to be a collaboration destination of the input-output service apparatus 10 is added or deleted (hereinafter, referred to as an addition or the like), it is sufficient to conduct the addition or the like of the external service collaboration unit 140 corresponding to the specific external storage system 30.

Therefore, in the input-output service apparatus 10 of the first embodiment, an influence caused by the addition or the like of the external storage system 30, which is to be the collaboration destination, can be localized. Said differently, the input-output service apparatus 10 of the first embodiment can perform the addition or the like of the external storage system 30 to be the collaboration destination without influencing the other function structure (e.g., the input-output service process unit 110, the web service process unit 120, and so on). Here, a software development kit (SDK) may be used for the addition or the like of the external service collaboration unit 140.

The app information memory unit 150 stores the app information 1000 in association with an app ID. The app information 1000 includes at least one piece of the process flow information 1100. The process flow information 1100 defines the sequence of processes (the process flow) substantializing the service supplied by the app information 1000.

<<MFP>>

Figure 5:
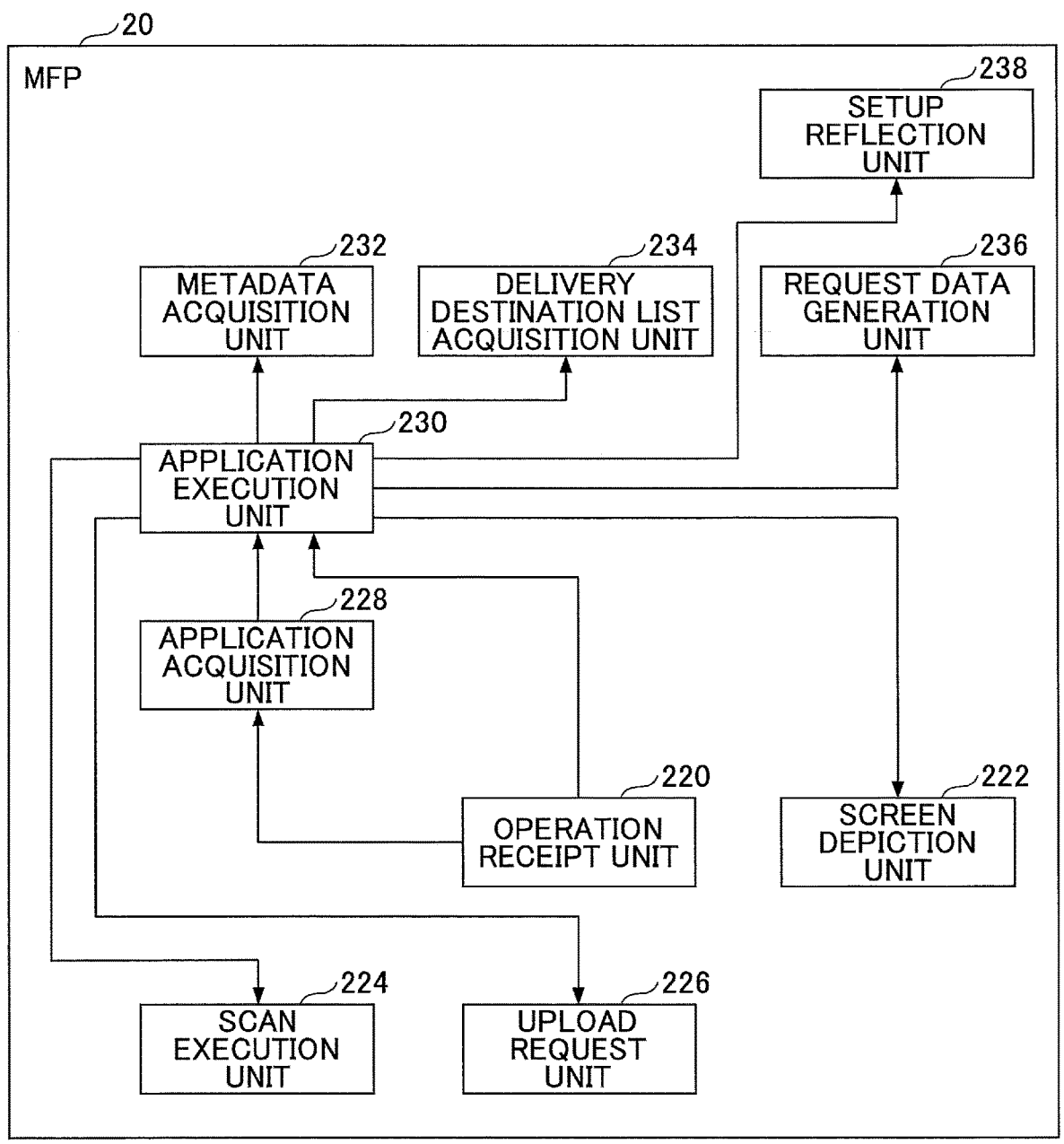
FIG. 5 illustrates a function structure of an exemplary MFP of the embodiment.

FIG. 5 illustrates a function structure of an exemplary MFP of the first embodiment. In the function structure of the MFP 20 illustrated in FIG. 5, functions irrelevant to the explanation of the first embodiment are omitted. Referring to FIG. 5, the MFP 20 includes an operation receipt unit 220, a screen depiction unit 222, a scan execution unit 224, and an upload request unit 226. Further, the MFP 20 includes an application acquisition unit 228, an application execution unit 230, a metadata acquisition unit 232, a delivery destination list acquisition unit 234, a request data generation unit 236, and a setup reflection unit 238.

Various units illustrated in, for example, FIG. 5 are implemented by the processes executed by the MFP application in the browser 210 installed in the MFP 20. The metadata acquisition unit 232, the delivery destination list acquisition unit 234, the request data generation unit 236, and the setup reflection unit 238 are implemented by, for example, a script included in the MFP application.

The operation receipt unit 220 receives operations such as a selection of the delivery destination folder, a change in a scanning condition, and an execution of a job from a user. The screen depiction unit 222 depicts an application screen on the operation panel 602. The scan execution unit 224 requests the scanner 606 to execute scanning to cause the scanner 606 to execute the scanning. The upload request unit 226 requests the input-output service apparatus 10 to upload the scanned image data (a scan result) to the external storage system 30.

The application acquisition unit 228 acquires the MFP application from the contents supply service apparatus 14. The contents supply service apparatus 14 supplies the MFP application to the MFP 20 described using, for example, HTML, CSS, or JavaScript. The application execution unit 230 executes the MFP application.

The metadata acquisition unit 232 acquires the metadata for generating the request data to the input-output service apparatus from the metadata generation service apparatus 12. The delivery destination list acquisition unit 234 acquires the folder list from the external storage system 30 in order to display a candidate of the delivery destination folder for the external storage system 30.

The request data generation unit 236 generates the request data (an upload option) to the input-output service apparatus 10 based on the acquired metadata. The detailed process of generating the request data based on the metadata is described later. The setup reflection unit 238 reflects the delivery destination folder and the scan condition, which are selected by the user, to the setup.

<<Metadata Generation Service Apparatus>>

Figure 6:
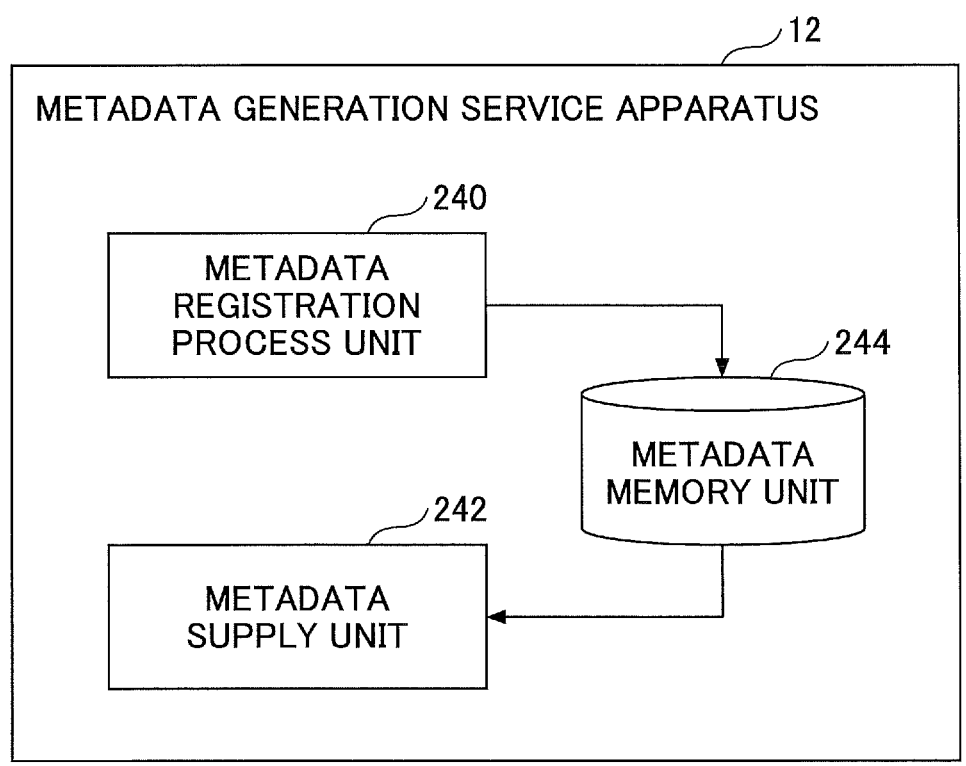
FIG. 6 illustrates a function structure of an exemplary metadata generation service apparatus of the embodiment.

FIG. 6 illustrates the function structure of an exemplary metadata generation service apparatus of the first embodiment. Referring to FIG. 6, the metadata generation service apparatus 12 includes a metadata registration process unit 240 and a metadata supply unit 242. These units are implemented when one or more programs installed on the metadata generation service apparatus 12 are executed by the CPU 506.

Further, the metadata generation service apparatus 12 includes a metadata memory unit 244. The metadata memory unit 244 can be implemented by the HDD 508. The metadata memory unit 244 may be implemented by a memory device connected to the metadata generation service apparatus 12 through the network.

The metadata registration process unit 240 receives registration of the metadata of the request data for the input-output service apparatus 10 from the developer of the MFP application and registers the metadata into the metadata memory unit 241. The metadata supply unit 242 receives a request to acquire the metadata from the MFP 20 and supplies the metadata to the MFP 20.

<Detailed Process>

Described next is a detailed process of the information processing system 1 of the first embodiment.

<<Registration Phase>>

Figure 7:
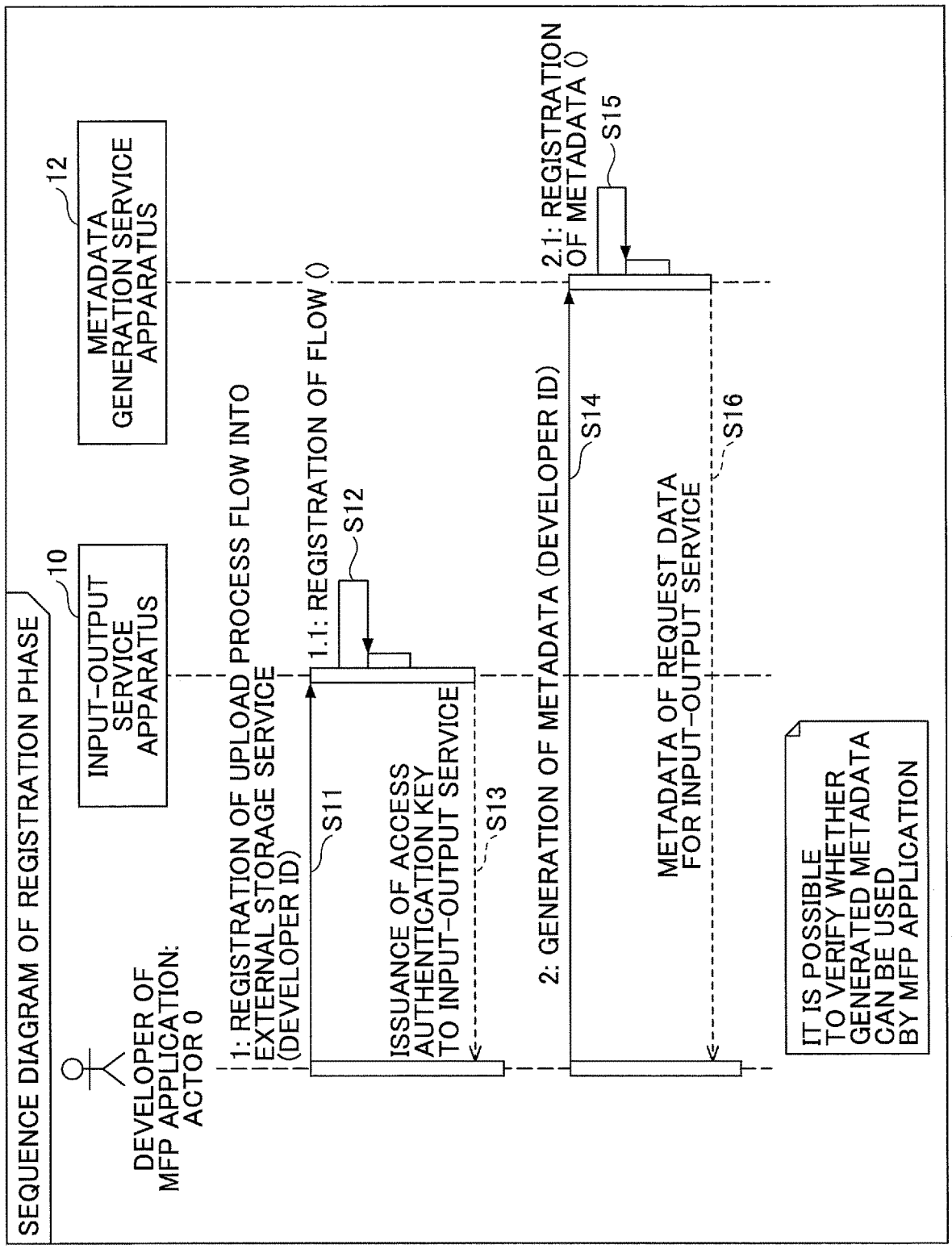
FIG. 7 is a sequence diagram illustrating an exemplary registration phase.

FIG. 7 is a sequence diagram illustrating an exemplary registration phase. Referring to the sequence diagram of FIG. 7, the developer of the MFP application directly operates the input-output service apparatus 10 or the metadata generation service apparatus 12. However, the present invention is not limited thereto. For example, the developer may operates a terminal device or the like, which is connected to the input-output service apparatus 10 or the metadata generation service apparatus 12 through the network.

In step S11, the developer designates the developer identification (ID) and requests the input-output service apparatus 10 to register the scan delivery service. The input-output service apparatus 10 registers a process flow of the scan delivery service as process flow information 1100. In step S13, the input-output service apparatus 10 issues an access authentication key for the input-output service apparatus 10.

Figure 8:
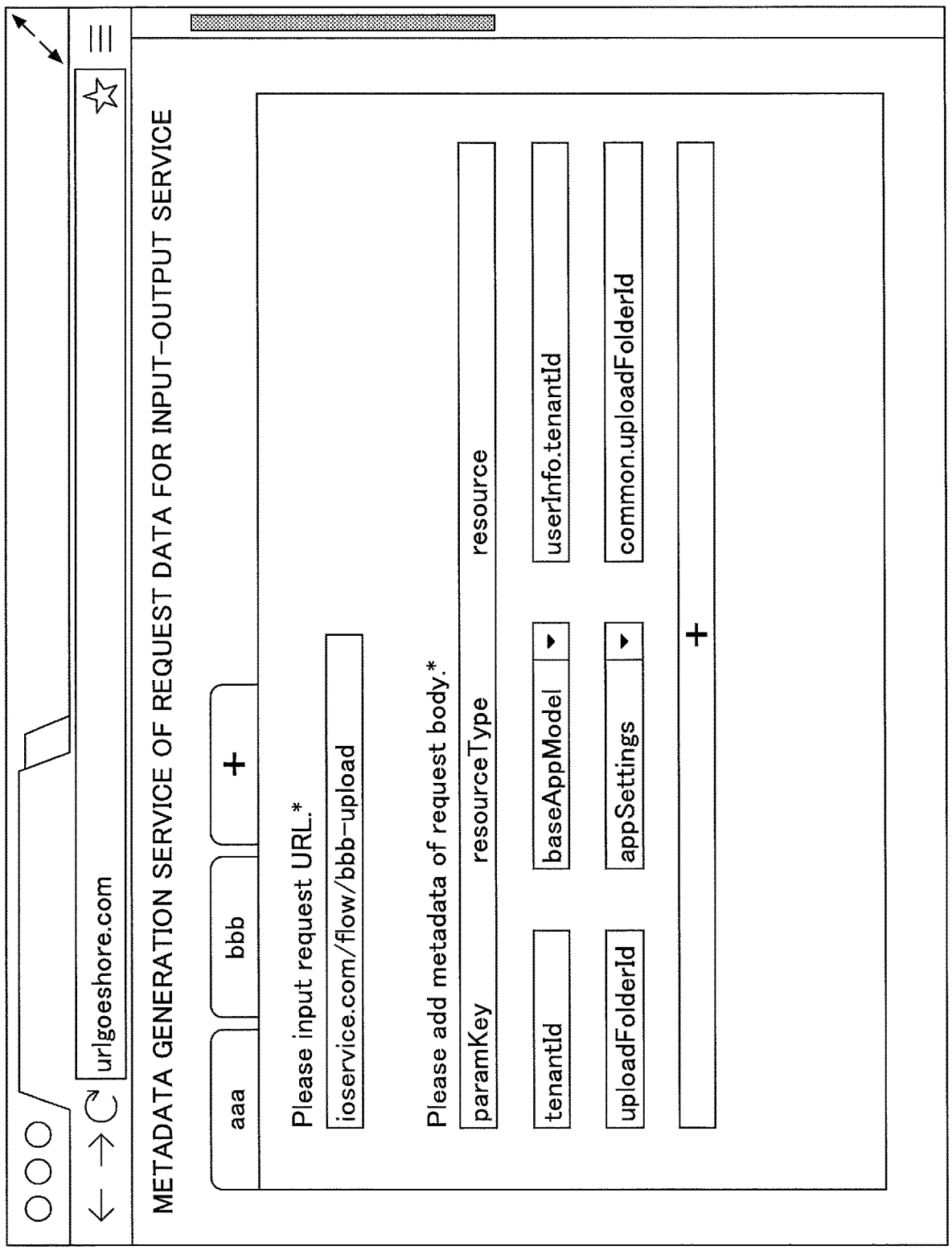
FIG. 8 is an image view of an exemplary metadata generation service screen.

In step S14, the developer designates the developer ID to request the metadata generation service apparatus 12 to generate the metadata. For example, the developer requests the metadata to be generated through the metadata generation service screen. FIG. 8 is an image view of an exemplary metadata generation service screen.

Referring to FIG. 8, the metadata generation service screen may switch over and display a metadata registration area provided for each external storage system 30. A tag "+" may be used to newly add the external storage system 30. When the developer pushes the tag "+", the display may be switched over to the metadata registration area of the external storage system 30, which is requested to be newly added. The developer may easily register the metadata of the external storage system 30, which are requested to be newly added, through the switched over and displayed metadata registration area.

The metadata registration area of FIG. 8 illustrates an example of registering a request uniform resource locator (URL) and metadata of a request body for the input-output service apparatus 10. The request URL is identification information of the process flow. If the identification of the process flow is possible, the request URL may be replaced by an ID, a character string, a sign, or the like.

Referring to FIG. 8, "paramKey" is a key for the request body. The "resourceType" sets whether a value "baseAppModel" is used or a value "appSetting" is used. The "baseAppModel" designates a value stored inside the MFP application. The "appSetting" designates a value acquired from a web service other than the MFP application. Further, the "resource" designates a location (a key) of a value designated by "resourceType". Finally, the metadata are output using a JavaScript Object Notation (JSON) format illustrated in FIG. 9.

FIG. 9 illustrates a structure of exemplary metadata for generating request data for the input-output service apparatus. The metadata of FIG. 9 are registered as including the request URL "flowUrl" 3010 registered in FIG. 8 and the metadata "flowParamMappings" 3020 of the request body registered in FIG. 8. As described, the developer may easily registers the metadata through the metadata generation service screen illustrated in FIG. 8.

Referring back to FIG. 7, in step S15, the metadata generation service apparatus 12 registers the metadata requested to be generated by the metadata generation service screen illustrated in FIG. 8 into the metadata memory unit 244. In step S16, the metadata generation service apparatus 12 returns the metadata 3000 registered in step S15 to the developer.

The information processing system 1 of the first embodiment may be provided with a function of verifying whether the metadata 3000 registered in step S15 can be used by the MFP application after step S16. As described below, the MFP application can generate the request data (an upload option) for the input-output service apparatus 10 by analyzing the metadata 3000 of the JSON format.

<<Use Phase>>

Figure 10:
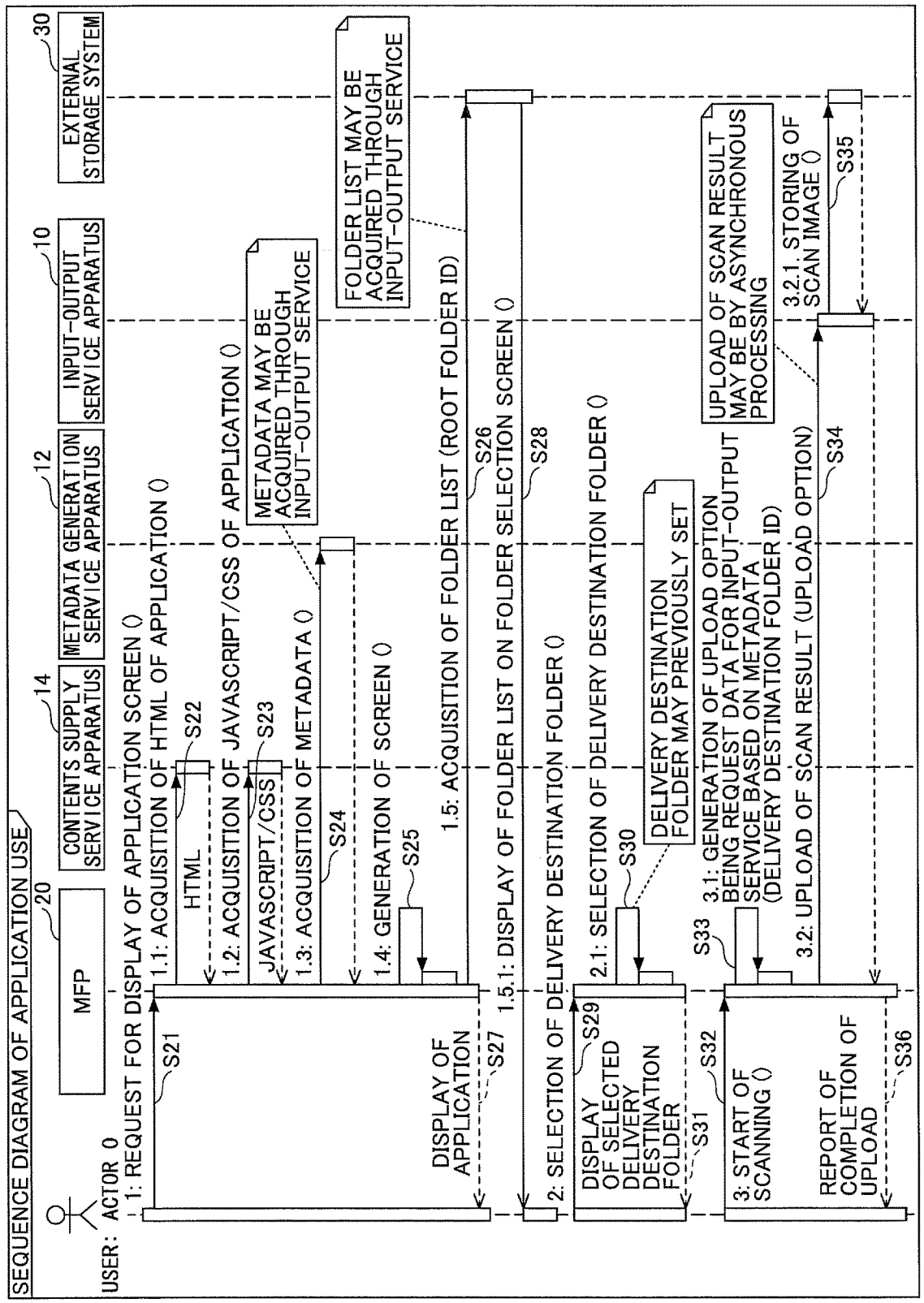
FIG. 10 is an exemplary sequence chart of a use phase.

FIG. 10 is a sequence diagram illustrating an exemplary use phase. Referring to FIG. 10, the sequence diagram illustrates an exemplary process that the user uses the scan delivery service. In step S21, the user operates the MFP 20 to request a screen display of the MFP application.

In step S22, the application acquisition unit 228 of the MFP 20 acquires HTML data of the MFP application designated by the user. In step S23, the application acquisition unit 228 acquires CSS data and JavaScript data of the MFP application designated by the user.

When the MFP 20 executes the CSS data and the JavaScript data of the acquired MFP application, the metadata acquisition unit 232, the delivery destination list acquisition unit 234, the request data generation unit 236, and the setup reflection unit 238 are implemented so as to be usable.

In step S24, the metadata acquisition unit 232 of the MFP 20 designates identification information uniquely identifying the metadata such as the metadata ID and acquires the metadata from the metadata generation service apparatus 12. The MFP 20 may acquire the metadata through the input-output service apparatus 10.

In step S25, the application execution unit 230 causes the screen depiction unit 222 to generate a screen of the MFP application. In step S26, the delivery destination list acquisition unit 234 designates a root folder ID and requests to acquire a folder list from the external storage system 30. In step S27, after the screen depiction unit 222 of the MFP 20 generates the screen for the MFP application, the screen depiction unit 222 displays the screen for the MFP application.

In step S28, the MFP 20 acquires the folder list from the external storage system 30. The screen depiction unit 222 of the MFP 20 displays the folder list acquired from the external storage system 30 on the folder selection screen illustrated in FIG. 11.

Figure 11:
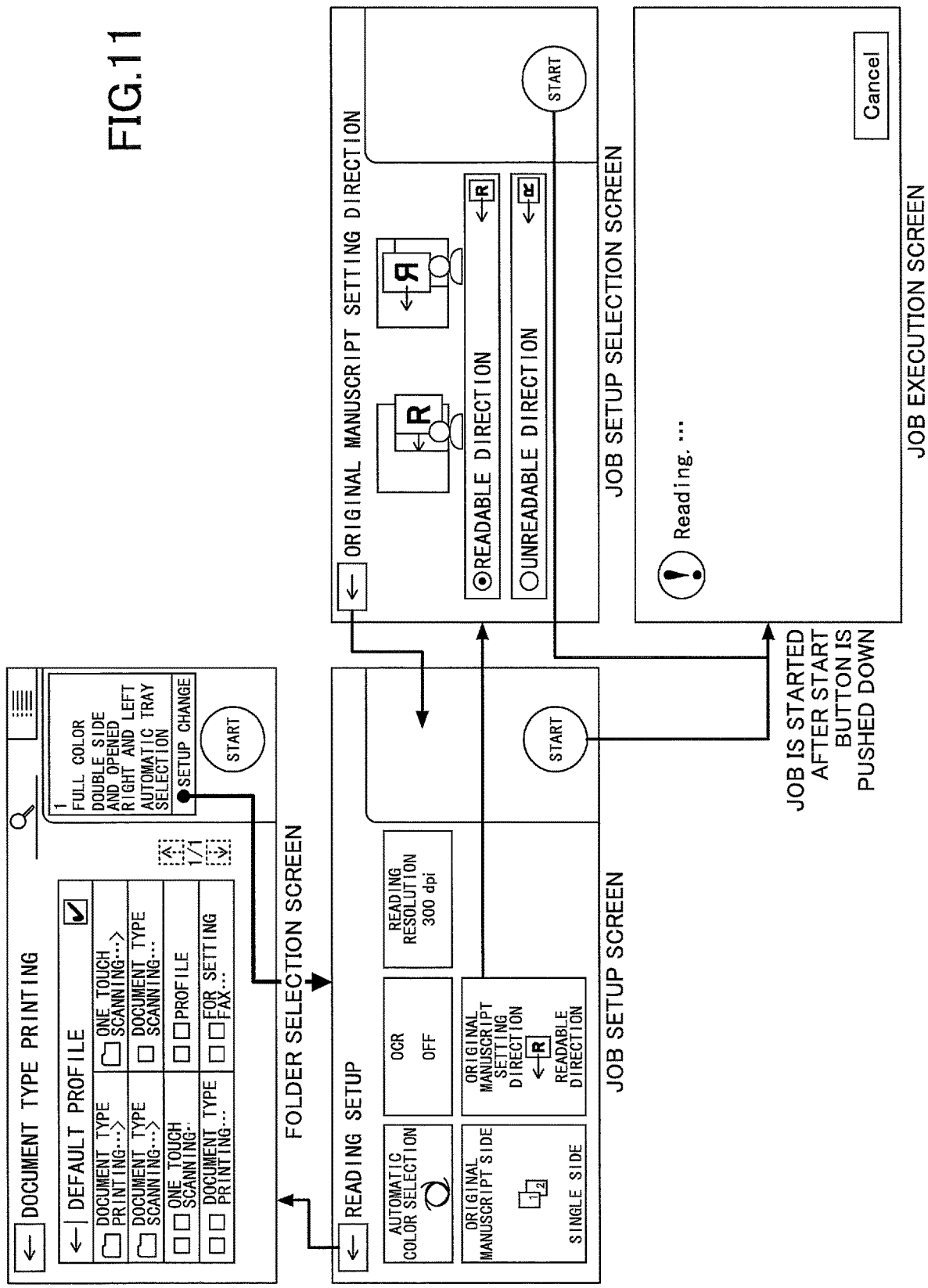
FIG. 11 is a screen transition diagram of an exemplary MFP application.

FIG. 11 is a screen transition diagram of an exemplary MFP application. A setup change button is displayed on the folder selection screen illustrated in FIG. 11. When the setup change button is pushed down, the folder selection screen of the MFP 20 transits to the job setup screen. The job setup screen is provided so that the user can confirm job setup. The MFP 20 displays a job setup selection screen after the job setup is selected from the job setup screen. The job setup selection screen is a screen for receiving a change of the job setup from the user.

Start buttons are respectively provided on the folder selection screen, the job setup screen, and the job setup selection screen. After the start button is pushed down, the MFP 20 displays the job execution screen to start the job.

Referring back to step S29, the user receive the selection of the delivery destination folder from the folder selection screen. In step S30, the screen depiction unit 222 of the MFP 20 makes the delivery destination folder selected by the user a selected state. Here, the delivery destination folder may be previously set. In step S31, the MFP 20 causes the display of the delivery destination folder selected by the user to be displayed as the selected state on the folder selection screen.

Step S32, the user pushes the start button in order to request the MFP 20 to start scanning. The scan execution unit 224 of the MFP 20 causes the scanner 606 to execute scanning. In step S33, the request data generation unit 236 of the MFP 20 generates request data (the upload option) for the input-output service apparatus 10 according to the procedure illustrated in, for example, FIG. 12 based on the metadata.

Figure 12:
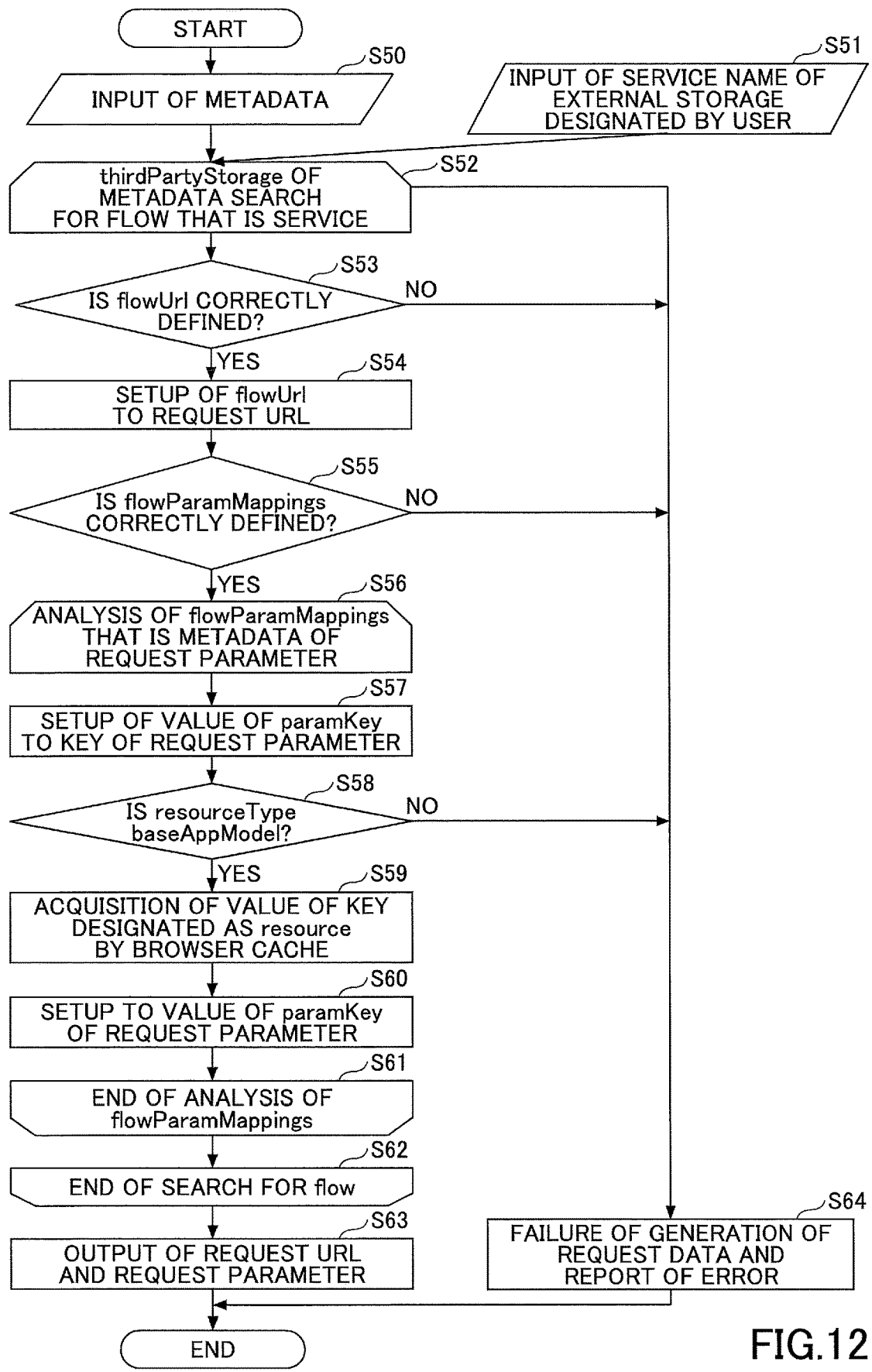
FIG. 12 is a flowchart of an exemplary process of generating request data from metadata.

FIG. 12 is a flowchart of an exemplary process of generating the request data from the metadata. In step S50, the request data generation unit 236 receives the metadata acquired from the metadata generation service apparatus 12 in step S24. In step S51, the request data generation unit 236 receives the name "service" of the external storage system 30 of the delivery destination folder selected by the user.

In step S52, the request data generation unit 236 searches for the metadata having "thirdPartyStorage" of "service". In a case where the name of the external storage system 30 of the external storage system 30 of the delivery destination folder selected by the user is, for example, "bbb", the request data generation unit 236 can search for the metadata as illustrated in FIG. 9.

In step S53, the request data generation unit 236 determines whether "flowUrl" 3010 is correctly defined in the metadata searched in step S52. When the request data generation unit 236 determines that "flowUrl 3010 is correctly defined, the request data generation unit 236 sets "flowUrl" 3010 of the metadata searched in step S52 into "flowUrl" of the request data.

In step S55, the request data generation unit 236 determines whether "flowParamMappings" 3020 is correctly defined in the metadata searched in step S52.

When the request data generation unit 236 determines that "flowParamMappings" 3020 is correctly defined, the request data generation unit 236 analyzes "flowParamMappings" in step S56. In step S57, the request data generation unit 236 reads a value "paramKey" of "flowParamMappings" 3020 and sets the read "paramKey" as a key for "flowParams" of the request data.

For example, in a case of the metadata illustrated in FIG. 9, the request data generation unit 236 reads tenantId, uploadFolderId, filename, and ocr236, which are the value of "paramKey" of "flowParamMappings" 3020.

The request data generation unit 236 sets the read tenantId, uploadFolderId, filename, and ocr as a key of "flowParams" of the request data.

In step S58, the request data generation unit 236 determines whether the value of "resourceType" of "flowParamMappings" 3020 is "baseAppModel".

When the request data generation unit 236 determines that the value of "resourceType" of "flowParamMappings" 3020 is "baseAppModel", the process proceeds to step S59, and the request data generation unit 236 acquires the location (the key) of the value set to "resource" of "flowParamMappings" 3020. Then, the request data generation unit 236 acquires the value of the acquired key from the cache of the browser 210.

In step S60, the request data generation unit 236 sets the value acquired in step S59 as the value of the key of the request data "flowParams". The processes of steps S56 to S60 are repeated until the analyzation of "flowParamMappings" is completed. The processes of steps S52 to S60 are repeated until the metadata whose "thirdPartyStorage" is "service".

After the analyzation of "flowParamMappings" 320 and the search for the metadata whose "thirdPartyStorage" is "service" are completed, the request data generation unit 236 can output the request data illustrated in FIG. 13. The "flowUrl" and "flowParams" are set in the request data illustrated in FIG. 13. FIG. 13 illustrates a structure of exemplary request data.

When the request data generation unit 236 did not search the metadata in step S52 of the flowchart illustrated in FIG. 12, the process goes to step S64 and an error is reported to the user. This error is caused by an incorrect definition of the metadata of the external storage system 30 of the delivery destination folder selected by the user.

In step S53, when "flowUrl" 3010 has not been correctly defined, the request data generation unit 236 goes to step S64 and reports the error to the user. In step S55, when "flowParamMappings" 3020 has not been correctly defined, the request data generation unit 236 goes to step S64 and reports the error to the user. In step S58, when "baseAppModel" 3020 has not been "baseAppModel", the request data generation unit 236 goes to step S64 and reports the error to the user.

Referring back to step S34 illustrated in FIG. 10, the upload request unit 226 requests the input-output service apparatus 10 to upload the image data (a scan result) obtained by scanning using the scanner 606. The request of step S34 uses the request data (the upload option) illustrated in, for example, FIG. 13 and generated in step S33.

Then, the process goes to step S35. The input-output service apparatus 10 stores the image data (the scan image) being the scan result into the external storage system 30 based on the request data received from the MFP. After the scan image is completely stored into the external storage system 30, the input-output service apparatus 10 reports the completion of the upload to the MFP 20. The request to upload the scan result in step S34 may be asynchronous processing.

<General Overview>

Within the first embodiment, the MFP application can generate the request data for the input-output service based on the metadata defined by the metadata generation service apparatus 12 that is other than the MFP application.

Therefore, in developing the MFP application being the apparatus collaboration service that enables to distribute to multiple external storage systems 30, a setup to add or switch the external storage system 30 can be easy.

Second Embodiment

Within the first embodiment, the MFP application supplying the scan delivery service has been explained as the example. The MFP application of the second embodiment supplies a download print service. Because the second embodiment is similar to the first embodiment except for a portion of the second embodiment, the explanation of the same portion is appropriately omitted.

Figure 14:
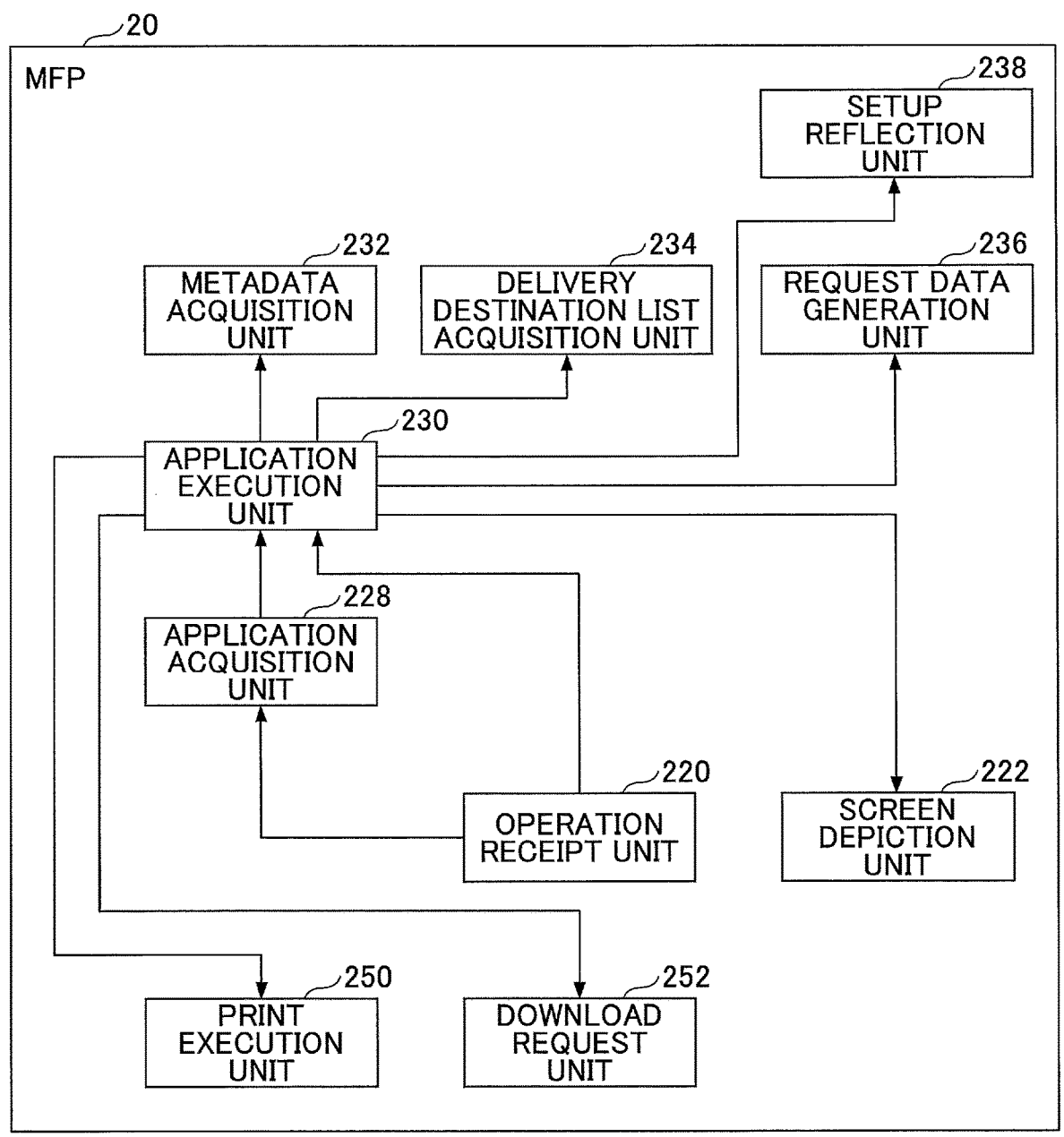
FIG. 14 illustrates a function structure of another exemplary MFP of the embodiment.

FIG. 14 illustrates a function structure of another exemplary MFP of the second embodiment. In the MFP 20 illustrated in FIG. 14, the scan execution unit 224 and the upload request unit 226 of the MFP 20 illustrated in FIG. 5 are replaced by a print execution unit 250 and a download request unit 252. The print execution unit 250 causes the printer 605 to print data. The download request unit 252 requests the input-output service apparatus 10 to download the print data from the external storage system 30.

FIG. 15 illustrates a structure of exemplary metadata for generating request data (a download option) for the input-output service apparatus. For example, the request URL of the metadata 4000 illustrated in FIG. 15 is "flowUrl" 4010 and the request body of the metadata 4000 illustrated in FIG. 15 is "flowParamMappings" 4020 in registering the metadata 4000. The metadata 4000 illustrated in FIG. 15 includes items illustrated in, for example, FIG. 16.

FIG. 17 illustrates a structure of exemplary request data (the download option). The request data illustrated in FIG. 17 includes items illustrated in, for example, FIG. 18. The request data generation unit 236 of the MFP 20 generates the request data (the download option) illustrated in FIG. 17 in accordance with, for example, the procedure illustrated in FIG. 12 based on the metadata illustrated in FIG. 15.

<General Overview>

Within the second embodiment, the MFP application can generate the request data for the input-output service based on the metadata defined by the metadata generation service apparatus 12 that is other than the MFP application.

Therefore, in developing the MFP application being the apparatus collaboration service that enables to download the print data from multiple external storage systems 30, a setup to add or switch the external storage system 30 can be easy.

The present invention is not limited to the specifically disclosed embodiments, and variations and modifications may be made without departing from the scope of the present invention. For example, the input-output service apparatus 10 is an example of an input-output service supply unit recited in scope of claims. The metadata supply unit 242 is an example of a metadata supply unit recited in the scope of claims. The request data generation unit 236 is an example of a request data generation unit recited in the scope of claims. The application execution unit 230 is an example of a request unit recited in the scope of claims. The metadata registration process unit 240 is an example of a metadata registration process unit recited in the scope of claims.

The metadata memory unit 244 is an example of a metadata memory unit recited in the scope of claims. The browser 210 is an example of browsing software recited in the scope of claims. The MFP 20 is an example of an input-output device recited in the scope of claims. The metadata acquisition unit 232 is an example of a metadata acquisition unit recited in the scope of claims. The image data and print data is an example of electronic data (image data and print data) recited in the scope of claims.

According to the embodiments of the present invention, the setup of the external storage service collaborating with the input-output device can be made easy.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system including at least one input-output device and performing a sequence of processes using electronic data that include image data and print data, the information processing system comprising:
    a first hardware processor that executes a program so as to implement:
        an input-output service supply unit configured to
            register a collaboration process in which a hardware computer system collaborates with the at least one input-output device to implement an external storage service, the registration of the collaboration process including
                accepting a registration request to register the external storage service, the registration request being associated with a developer ID,
                registering a process flow of the external storage service as process flow information, and
                issuing an access authentication key for the input-output service supply unit; and
            perform the collaboration process of causing the hardware computer system to collaborate with the at least one input-output device in implementing the external storage service; and
    a second hardware processor that executes another program so as to implement:
        a request data generation unit configured to generate request data bound for the input-output service supply unit, the request data including items of metadata as a key, the metadata being data for generating the request data; and
        a request unit configured to request the input-output service supply unit to perform the collaboration process using the request data.

2. The information processing unit according to claim 1, the information processing system further comprising:

a third hardware processor that executes another program so as to implement:
a metadata supply unit configured to supply the metadata bound for the input-output service supply unit to the input-output service supply unit; and
a metadata registration process unit configured to receive registration of the metadata from a user; and
a hardware memory unit to implement:
a metadata memory unit configured to store the metadata, of which registration is received,
wherein the metadata registration process unit receives, as the metadata, the registration of
identification information of the collaboration process performed by the input-output service supply unit,
an item for the request data for the collaboration process identified by the identification information to the input-output service supply unit, and
a location of a value of the item.

3. The information processing unit according to claim 1, wherein the request data generation unit generates the request data for uploading the image data that are input by the at least one input-output device into the hardware computer system implementing the external storage service.

4. The information processing unit according to claim 1, wherein the request data generation unit generates the request data for downloading output data that are output by the at least one input-output device from the hardware computer system implementing the external storage service.

5. The information processing unit according to claim 2, wherein the external storage service includes multiple external storage services, and
wherein the metadata registration process unit is configured to define, as the metadata with respect to the hardware computer system implementing the multiple external storage services, the registration of
the identification information of the collaboration process performed by the input-output service supply unit,
the item for the request data for the collaboration process identified by the identification information to the input-output service supply unit, and
the location of the value of the item.

6. The information processing unit according to claim 1, the information processing system further comprising:
a fourth hardware processor that executes another more program so as to implement:
a contents supply unit configured to supply contents to the at least one input-output device,
wherein the at least one input-output device executes a contents program included in the contents supplied by the contents supply unit so as to function as the request data generation unit.

7. The information processing unit according to claim 6, wherein the at least one input-output device executes a script included in the contents in browsing software so as to implement the request data generation unit.

8. The information processing system according to claim 1, wherein the collaboration process, by the input-output service supply unit, of causing the hardware computer system implementing the external storage service to collaborate with the at least one input-output device using the request data is a process of uploading the image data that are input by the at least one input-output device into the hardware computer system implementing the external storage service.

9. The information processing system according to claim 1, wherein the collaboration process, by the input-output service supply unit, of causing the hardware computer system implementing the external storage service to collaborate with the at least one input-output device using the request data is a process of downloading output data that are output by the at least one input-output device from the hardware computer system implementing the external storage service.

10. A requesting method executed in an input-output device that executes a sequence of processes using electronic data in collaboration with at least one information processing apparatus, the requesting method comprising:
registering a collaboration process in which a hardware computer system collaborates with the input-output device to implement an external storage service;
acquiring metadata for generating request data bound for an input-output service supply unit that is configured to perform the collaboration process of causing the hardware computer system to collaborate with the input-output device in implementing the external storage service, the request data including items of the metadata as a key, the metadata being data for generating the request data;
generating the request data bound for the input-output service supply unit based on the acquired metadata; and
requesting the input-output service supply unit to perform the collaboration process using the request data, wherein
the registering of the collaboration process includes
accepting a registration request to register the external storage service, the registration request being associated with a developer ID,
registering a process flow of the external storage service as process flow information, and
issuing an access authentication key for the input-output service supply unit.

11. A requesting method executed in an information processing system that includes at least one information processing apparatus and at least one input-output device and executes a sequence of processes using electronic data, the requesting method comprising:
registering a collaboration process in which a hardware computer system collaborates with the input-output device to implement an external storage service;
supplying metadata for generating request data bound for an input-output service supply unit that is included in the at least one information processing apparatus and is configured to perform the collaboration process of causing the hardware computer system to collaborate with the at least one input-output device in implementing the external storage service, the request data including items of the metadata as a key, the metadata being data for generating the request data;
generating the request data bound for the input-output service supply unit based on the supplied metadata; and
requesting the input-output service supply unit to perform the collaboration process using the request data, wherein
the registering of the collaboration process includes
accepting a registration request to register the external storage service, the registration request being associated with a developer ID, registering a process flow of the external storage service as process flow information, and issuing an access authentication key for the input-output service supply unit.

12. The information processing system according to claim 2, wherein the third hardware processor is connected with the second hardware processor via a network, and the second hardware processor receives the metadata from the third hardware processor via the network.

13. The requesting method according to claim 10, wherein the at least one information processing apparatus is connected with the input-output device via a network, and the input-output device receives the metadata from the at least one information processing apparatus via the network.

14. The requesting method according to claim 11, wherein the at least one information processing apparatus is connected with the at least one input-output device via a network, and the at least one input-output device receives the metadata from the at least one information processing apparatus via the network.

* * * * *